Jan. 28, 1969　　　　D. P. AREND　　　　3,423,846

CIRCUIT ANALYSIS SYSTEM

Filed Dec. 23, 1966

INVENTOR

DONALD P. AREND

United States Patent Office 3,423,846
Patented Jan. 28, 1969

3,423,846
CIRCUIT ANALYSIS SYSTEM
Donald P. Arend, 3877 Kirkwood St.,
Jackson, Mich. 49203
Filed Dec. 23, 1966, Ser. No. 604,268
U.S. Cl. 35—19        6 Claims
Int. Cl. G09b 23/06; G09f 9/02

ABSTRACT OF THE DISCLOSURE

The invention concerns a circuit layout and analysis system used in the design, teaching and analysis of circuits, such as electrical, fluid and air circuits, utilizing circuit component symbol indicators having obverse and reverse faces upon which the component symbol appears. The faces of the indicator are color coded to indicate different conditions of the represented component, and, preferably, the indicators are formed of a magnet material used in conjunction with a layout sheet associated with a magnetic material wherein magnetic attraction maintains the indicator upon the layout sheet.

---

Figure 1:
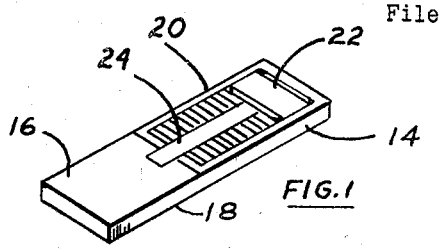

Electrical air and hydraulic circuits can be graphically illustrated by employing lines to represent conductors of electricity, air or hydraulic pressure, and symbols to represent switches, valves, transformers, condensers, resistors, etc., and other control components. The symbols employed to graphically illustrate the control components of electric, air and hydraulic circuits are well known, whereby one skilled in the art is able to observe a circuit diagram and understand the operation and control of the apparatus utilizing the circuit.

The most common means for designing and representing a circuit is by drawing the circuit and components several times upon a layout sheet wherein the components are shown in separate figures to illustrate the condition of the components during various phases of operation. With the advent of complex automated machinery and sophisticated circuitry, the design and analysis of circuit diagrams becomes increasingly difficult and, due to the simultaneous operation of a number of the circuit components, it is often necessary for the designer to draw many circuit and subcircuit diagrams in order to check the sequence of control being obtained and, furthermore, the designer must often remember the condition of a number of components at various phases of operation in order to be able to trace through the operation and condition of the various components.

Basically, control components are capable of assuming two conditions, for instance, an "on" and an "off" condition, a "plus" or "minus" condition, a "passing" or "nonpassing" air condition, or a "passing" or "nonpassing" fluid condition. Relays often simultaneously operate a number of contacts and, thus, although the relay is normally either energized or not energized, either condition usually involves some contacts which are normally open and others which are normally closed. Upon the energization of the relay, it becomes difficult for the designer to remember which contacts are open and which are closed, particularly if the relay includes several sets of contacts.

It is an object of the invention to provide a circuit layout and analysis system which significantly simplifies the design, analysis and teaching of a circuit diagram and provides the improvement by utilizing circuit component indicators capable of being readily changed from one condition to another, whereby the observer is able to readily discern the condition of the component and need not rely upon his memory to appreciate the condition of the circuit at any given time.

Another object of the invention is to provide a circuit analysis system wherein the circuit components are represented upon reversible indicators which are placed upon a layout sheet on which the circuit conductors are represented, each of the indicators having first and second faces or sides on which the components are represented, only one face of which is visible to the viewer at a time, each of the faces representing a different condition of the component represented.

Yet another object of the invention is to provide a circuit analysis system employing circuit component indicators having reversible faces or sides wherein different conditions of the components are represented on the sides, and only one condition is visible to the viewer at a time, the indicators including means on at least one side which represent the initial condition of the component relative to the normal operation of the circuit.

A further object of the invention is to provide a circuit analysis system employing circuit component indicators adapted to be located upon a circuit layout sheet wherein magnetic force is utilized to maintain the circuit component indicators upon the desired position on the layout sheet.

Figure 2:
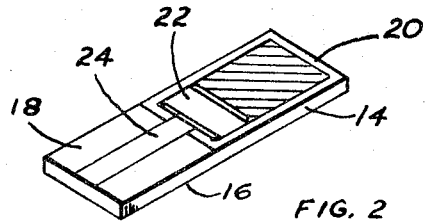
Figures 3, 4:
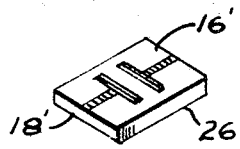
Figure 5:
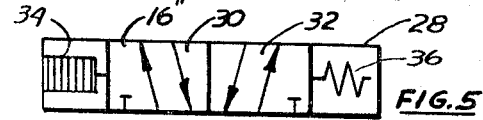
Figure 6:
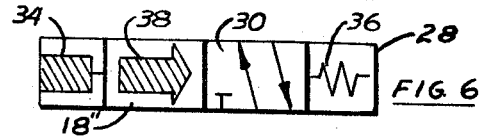
Figure 7:
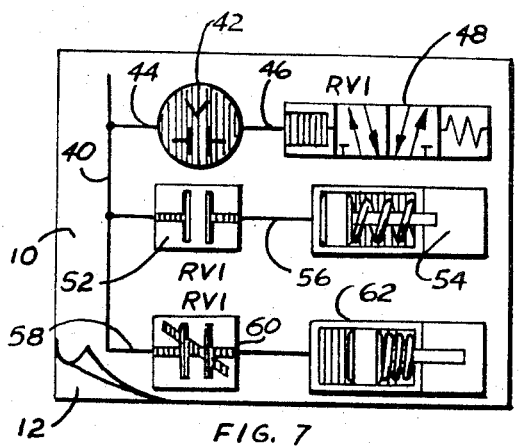
Figure 8:
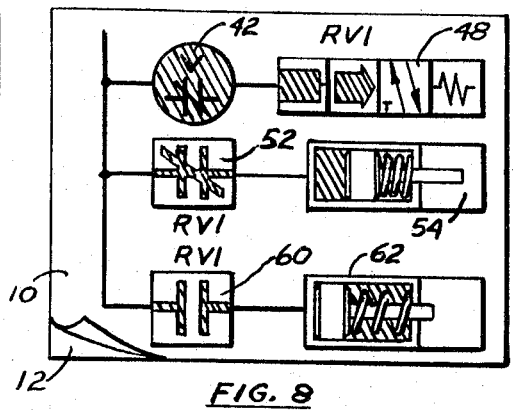
Figure 9:
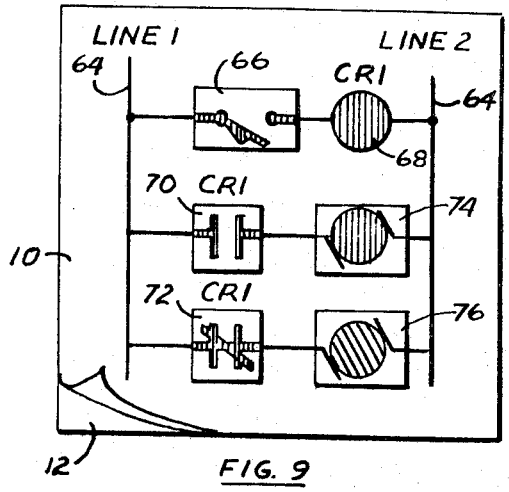
Figure 10:
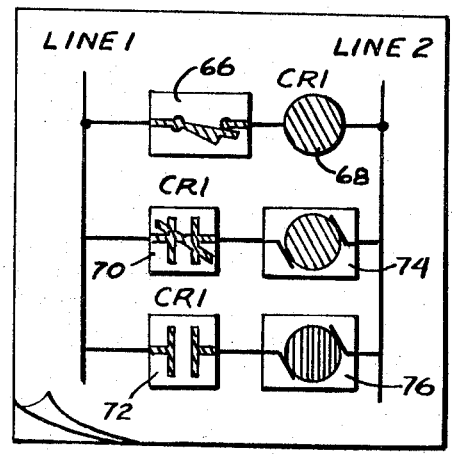

These and other objects of the invention arising from the details and relationships of the components of an embodiment thereof will be apparent from the following description and accompanying drawings wherein:

FIG. 1 is a perspective view of one side of a circuit component indicator in accord with the invention, FIG. 2 is a perspective view of the other side of the circuit component indicator of FIG. 1, the component being illustrated in FIGS. 1 and 2 representing a fluid-operated, expansible motor, FIG. 3 is a perspective view of another embodiment of a circuit component indicator representing normally open contacts, or a closed or nonpassing condition, FIG. 4 is a perspective view of the reverse side of the indicator of FIG. 3, representing a normally closed or passing condition, FIG. 5 is a plan view of one side of another embodiment of circuit component indicator representing an air-operated valve, FIG. 6 is the reverse side of the indicator of FIG. 5, illustrating the condition of the valve after being energized, FIG. 7 is a plan view of a circuit layout sheet incorporating the invention having a fluid circuit represented thereon, illustrating the components in the initial condition, FIG. 8 is an elevational view of the circuit of FIG. 7, illustrating the components in a second condition of operation, FIG. 9 is an elevational view of a layout circuit sheet in accord with the invention, illustrating an electrical circuit with the components indicating the initial condition, and FIG. 10 is a view similar to FIG. 9 illustrating the components in a second condition of operation.

As previously stated, the inventive concept includes the use of reversible circuit component indicators with a circuit diagram. The circuit diagram will normally be drawn or printed on a sheet of paper or could be drawn by means of chalk, for instance, upon a magnetic blackboard. In the drawing, FIGS. 7 through 10, the circuit diagram is shown as being represented upon a sheet of paper 10, a corner of which is folded back to reveal a ferrous metal sheet or plate 12 disposed immediately behind the paper sheet. It is to be appreciated that the use of the magnetic sheet 12, or a magnetic blackboard, is not mandatory, as the inventive principles may be utilized with circuit component indicators which are not of a magnetic nature.

It is merely necessary that the circuit layout sheet on which the circuit is defined be capable of retaining the circuit component indicators thereon at the desired location.

The preferred form of the circuit component indicators in accord with the invention is that of a flat body member 14 having first and second oppositely related, parallel sides or faces 16 and 18, respectively. In the embodiments of FIGS. 1 through 6, the body members are of rectangular form, but may be round, triangular, or any other desired shape. The body members may be formed of metal, plastic or any suitable material upon which the circuit component to be indicated my be drawn, printed, embossed, or otherwise indicated. Preferably, the indicator has sufficient thickness in the vertical direction, i.e., between sides 16 and 18, to permit the indicator to be readily grasped and removed by the fingers when placed upon a circuit layout sheet upon one of its sides. If the indicators are to be magnetic, the body members need to be formed of a magnetic material. In such event, it is preferable that the body members be formed of a ceramic or rubberized magnetic material wherein the poles of the body member occur at the faces 16 and 18. Forming the circuit component indicators of such a magnetic material is highly desirable, as it permits the indicators to be employed with either magnetic or nonmagnetic circuit layout sheets without significantly adding to the cost of manufacturing the indicators, and when used with a magnetic attractable layout sheet the indicators are not subject to accidental movement on the layout sheet and will remain at the position on which they are placed.

The indicator of FIG. 1 represents an expansible, fluid-operated motor. On each side of the indicator a cylinder is schematically represented at 20, the piston appears at 22 and the piston rod 24 affixed to the piston, extending through an opening in the cylinder. In FIG. 1 the piston is indicated on face 16 as being in the fully retracted position wherein pressurized fluid would occur in the cylinder region surrounding the piston rod. In FIG. 2, the pressurized portion occurs on the right of the piston and causes the piston to move to the left to produce full extension of the piston rod, as will be apparent from the representation of face 18.

It is desirable to color code the various sides of the circuit component indicators to indicate the initial condition of the component represented, or other component condition. Accordingly, in FIG. 1, the portion of the cylinder 20 not occupied by the piston 22 on face 16 may be colored red, as shown, to indicate that the initial condition of this component is with the piston rod fully retracted. On the opposite side of the indicator, on face 18, the cylinder may be internally colored green to indicate that the noninitial condition of the expansible motor is with the piston rod in the fully extended condition. If the circuit calls for an expansible fluid motor having an extended piston rod in the initial condition, an indicator similar to that shown in FIGS. 1 and 2 will be employed, except that the relationship of the components shown in FIG. 2 will include a red color code to indicate the initial condition, while the relationship shown in FIG. 1 would be color-coded green.

FIGS. 3 and 4 illustrate a circuit component indicator 26 representing electrical contacts, or may be used to indicate passing and nonpassing conditions in a hydraulic or air circuit system. In FIG. 3, the side 16' of the indicator illustrates the normally open or nonpassing condition, and the symbol representation in color-coded red to indicate that this is the initial condition. The reverse side 18' of the indicator 26 represents a normally closed or passing condition and is color-coded green to represent a noninitial condition.

The indicator 28 of FIGS. 5 and 6 represents a valve, such as would be used in a hydraulic or air circuit, wherein the valve is operated by a bellows or small, expansible motor. The valve may be of the spool type or other conventional type. On the side 16", as viewed in FIG. 5, one valve condition is shown at 30 and the opposite valve condition at 32. The actuator for the valve is represented at 34 and is indicated to be of the air type. If the actuator is an electric solenoid, the actuator may be so indicated. The representation 36 indicates that spring means are employed to return the valve to the normal condition, which is indicated by the red background of the actuator. The reverse side 18" of the indicator 28 is represented in FIG. 6, indicating that a portion 30 of the valve is being employed and that the valve has been shifted in the direction of the arrow 38. The green color coding on the side 18" indicates that this condition of the indicator is the noninitial condition.

FIGS. 7 and 8 illustrate a simplified fluid circuit utilizing the inventive concept and use of the indicators of the invention. The circuit layout sheet 10 is of paper and conductor 40 is drawn upon the sheet to represent a supply conduit. As a fluid circuit is being shown, such conductors would represent conduits for the transmission of the fluid, either liquid or air. An indicator 42 is placed upon the conduit 44 and represents a valve in a normal, initial "off" condition. Accordingly, the valve face visible to the viewer in FIG. 7 is color-coded red to indicate the normal or initial condition. The valve represented by indicator 42 communicates by a conduit 46 with a control valve indicator 48 which is shiftable between two positions and may be the type of valve represented in FIG. 5. The indicator 52 represents an initial condition of the valve 48 which is nonpassing, and this portion of the valve 48 communicates with the indicator 54 representing a fluid motor via conduit 56. The indicators 52 and 54 are color-coded red to indicate the initial condition represented in FIG. 7. The conductor 58 is associated with the indicator 60, representing that portion of the valve 48 which, in the initial condition would be in a passing condition, which causes the fluid motor, as represented by the indicator 62, to be in the extended position shown in FIG. 7. Likewise, the indicators 52 and 54 are color-coded red to represent the initial condition. Usually, it is desirable to use legends such as RV, RV1, etc., on the layout sheet to indicate association between components.

FIG. 8 illustrates the condition of the components of the circuit upon the valve 42 being opened. Opening of the valve 42 energizes the valve 48 to permit fluid flow through the valve section 52 and prevent fluid flow through the valve section 60. This condition is indicated on the circuit by reversing each of the indicators 42, 48, 52, 54, 60 and 62, whereby the representations on the opposite side of the indicators will now be apparent to the viewer. As the disclosed circuit produces operation of each of the illustrated components, all of the components will now be in their noninitial condition and, thus, a green color coding will appear upon each of the visible sides of the indicators. As the indicator may be very easily turned over from the condition of FIG. 7 to the relationship of FIG. 8 and as the color coding indicates the noninitial condition, the operation and condition of the various components of the circuits will be immediately apparent.

FIGS. 9 and 10 illustrate a simplified electrical circuit utilizing the concepts of the invention. The conductors 64 represent electrical supply conductors and the indicator 66 represents a normally open switch. The round indicator 68 represents a relay. The indicators 70 and 72 represent normally open and normally closed contacts, respectively, of the relay 68, and electric motors are represented by the indicators 74 and 76. With electric motors, lamps, and similar electrical components which include an "off" and "on" condition, color coding can be used to represent the "on" and "off" condition, rather than an initial condition and a noninitial condition. Thus, in FIGS. 9 and 10 the color coding of the motor indicators 74 and 76, when red, indicates that the motor is off, while coding the motor indicator green indicates that the motor is running. FIG. 9 represents the initial condition of the electrical circuit wherein the switch indicated by the indicator 66 is open and only the motor 76 will be energized as the relay contacts indicated by indicator 72 are normally closed. Closing of the switch 66, as indicated by reversing the switch indicator, FIG. 10, energizes the relay indicated by indicator 68 to actuate the contacts 70 to energize the motor 74 and deenergize the previously energized motor, as indicated by indicator 76. To indicate the difference in the circuitry, as represented between FIGS. 9 and 10, it is merely necessary for the operator to reverse the visible face of the indicators from the position of FIG. 9 to that of FIG. 10, whereby the opposite side thereof will now be visible to the viewer.

By placing a magnetic sheet or plate 12 such as of steel underneath the paper circuit layout sheet 10, the magnetic attraction within the magnetic indicators will firmly hold the indicators upon the sheet and, thus, accidental shifting of the indicators upon the sheet is prevented.

The invention permits a circuit to be readily comprehended by the designer or viewer and, as the reversing of the visible sides of the component indicators during each phase of operation makes the condition of the component immediately visible, it is not necessary for the designer or viewer to remember the condition of a particular component at a particular time. As the indicators are reversible, only one condition of the component is visible at a time, and misinterpretation of the condition of the component is eliminated, while simplifying manipulation of the component indicators. The color coding of the indicators to represent the initial condition is of significant aid in permitting an understanding of the circuit and also contributes to the improvement in circuit analysis provided by the inventive concept.

While the use of movable circuit component indicators upon a layout sheet is shown in United States Patent 2,835,987, shiftable type components such as shown in this patent are objectionable, in that accidental shifting can occur and as only one side of the component is ever used, misinterpretation of the condition of the component is possible. Additionally, the present invention does not require a component indicator holder or other auxiliary equipment to be affixed to the layout sheet, and with the invention it is possible to quickly clear a layout sheet of indicators by merely picking the indicators off the sheet and the circuitry can be completely redesigned by using a new sheet or erasing conductors which have been previously drawn.

It is appreciated that various modifications to the inventive concept may be apparent to those skilled in the art without departing from the spirit and scope thereof, and it is intended that the invention be defined only by the following claims.

I claim:

1. A circuit layout and analysis system comprising, in combination, a circuit layout sheet capable of having circuit conductors indicated thereon, a plurality of circuit component indicators each having first and second sides, said indicators adapted to be placed upon said sheet whereby one of said sides is visible to an observer viewing said circuit layout sheet, a circuit component symbol defined on said first side of each of said indicators representing a circuit component in a first condition, and a circuit component symbol defined on said second side of each of said indicators, the symbol defined on said second side of said indicators corresponding to the symbol appearing on the first side of the associated indicator in a second condition, whereby upon circuit conductors being defined on said sheet to define a predetermined circuit pattern and indicators being placed upon said sheet in apparent connection with said conductors, said conductors and indicators define a circuit, and various conditions of the resultant circuit are indicated by the side of the indicators visible, changes in the condition of components being indicated by turning the appropriate indicators whereby the appropriate side thereof becomes visible.

2. A circuit layout and analysis system as in claim 1 wherein means are defined on at least one of said sides of said circuit component indicators indicating the initial condition of the component represented with respect to the circuit with which the indicator is being employed.

3. A circuit layout and analysis system as in claim 2 wherein said means defined on said circuit component indicators indicating the initial condition of the component represented comprises a colored portion defined on said indicators.

4. A circuit layout and analysis system as in claim 1 wherein said indicators are formed of magnetic material and said layout sheet is of a magnetic material whereby magnetic forces maintain said indicators in position upon said sheet.

5. A circuit layout and analysis system as in claim 1 wherein said layout sheet comprises a sheet of non-magnetic material having an obverse side upon which said circuit conductors are defined and a reverse side, a magnetic plate disposed adjacent said reverse side of said layout sheet, said circuit component indicators comprising magnets having poles corresponding to said sides of said indicators whereby said indicators may be disposed upon said layout sheet and held thereon by magnetic forces attracting said indicators toward said magnetic plate.

6. A circuit layout and analysis system comprising, in combination, a circuit layout sheet capable of having circuit conductors indicated thereon, a plurality of generally flat circuit component indicators each having first and second sides, said indicators adapted to be placed upon said sheet whereby one of said sides is visible to an observer viewing said circuit layout sheet, a circuit component symbol defined on said first side of each of said indicators representing a circuit component in a first condition, and a circuit component symbol defined on said second side of each of said indicators, the symbol defined on said second side of said indicators corresponding to the symbol appearing on the first side of the associated indicator in a second condition, said first and second sides being of different colors to permit rapid visual interpretation of the symbol condition indicated, whereby upon circuit conductors being defined on said sheet to define a predetermined circuit pattern and indicators being placed upon said sheet in apparent connection with said conductors, said conductors and indicators define a circuit, and various conditions of the resultant circuit are indicated by the side and color of the indicators visible, changes in the condition of components being indicated by turning the appropriate indicators whereby the appropriate side thereof becomes visible.

References Cited

UNITED STATES PATENTS

| 2,723,465 | 11/1955 | Silverstein | 35—73 X |
| 2,752,245 | 6/1956 | Hough et al. | |
| 2,819,904 | 1/1958 | Nelson et al. | 273—137 X |
| 2,835,987 | 5/1958 | Heiser | 35—28 |
| 2,965,978 | 12/1960 | Olson | 35—23 |

EUGENE R. CAPOZIO, *Primary Examiner.*

H. S. SKOGQUIST, *Assistant Examiner.*

U.S. Cl. X.R.

35—7; 116—130